United States Patent [19]
DeNagel et al.

[11] Patent Number: 5,423,495
[45] Date of Patent: Jun. 13, 1995

[54] APPARATUS FOR WINDING SELECTABLE LENGTHS OF WEB

[75] Inventors: Craig C. DeNagel, Williamson; Robert J. Staunton, Webster, both of N.Y.

[73] Assignee: Eastman Kodak Company, Rochester, N.Y.

[21] Appl. No.: 171,052

[22] Filed: Dec. 21, 1993

[51] Int. Cl.6 .................................... B65H 18/08
[52] U.S. Cl. .................. 242/522; 242/535.2; 242/539; 226/118; 226/119
[58] Field of Search .......... 242/56 R, 522, 535.2, 242/539; 226/118, 119

[56] References Cited

U.S. PATENT DOCUMENTS

| | | | |
|---|---|---|---|
| 2,797,089 | 6/1957 | Lorig | 271/2.6 |
| 2,940,232 | 6/1960 | Wallace et al. | 53/112 |
| 3,049,309 | 8/1962 | Miller | 226/118 X |
| 3,386,638 | 6/1968 | Turner | 226/119 |
| 3,475,255 | 10/1969 | Lang | 226/119 X |
| 3,645,463 | 2/1972 | Helm | 242/56 R X |
| 3,712,553 | 1/1973 | Naper et al. | 242/56 R |
| 3,727,820 | 4/1973 | Braun | 226/118 X |
| 3,756,526 | 9/1973 | Bassett et al. | 242/56 R |
| 3,796,360 | 3/1974 | Alexeff | 226/119 |
| 4,179,079 | 12/1979 | Johanns | 242/56 R |
| 4,201,620 | 5/1980 | Platt et al. | 242/56 R X |
| 4,215,827 | 8/1980 | Roberts et al. | 226/118 X |
| 4,460,430 | 7/1989 | Kissell et al. | 242/56 R X |
| 4,856,692 | 8/1989 | Harper | 226/119 |
| 4,975,723 | 12/1990 | Hammerquist et al. | 226/119 X |
| 5,125,630 | 6/1992 | Hoyt et al. | 242/56 R |

Primary Examiner—John P. Darling
Attorney, Agent, or Firm—Charles E. Snee, III

[57] ABSTRACT

Apparatus (60) for winding strips of web (14) such as photographic film is provided with web storage modules (62, 120) which include a carriage (78, 132) mounted on a track (76, 130), the carriage supporting rollers 96, 98; 152, 154) which can moved along the track to change selectably the length of web stored. Locking plungers (84, 138) engage one of a plurality of bushings (82, 136) to hold the carriages in position and transducers (86-92; 140-150) signal a controller (94) of the length of web stored. Cutting and winding of the web are controlled in response to the signal.

12 Claims, 4 Drawing Sheets

APPARATUS FOR WINDING SELECTABLE LENGTHS OF WEB

DESCRIPTION

1. Technical Field

The invention concerns apparatus for transporting webs of material, such as photographic film. More particularly, the invention is related to such apparatus in which various lengths of the web are to be wound into rolls or onto spools, and in which means are provided for reconfiguring the apparatus for such various lengths.

2. Background Art

Various apparatus for transporting and processing webs are known in which some sort of mechanical accumulator is provided for storing a length of the web which is paid out as the apparatus operates. U.S. Pat. Nos. 2,797,089 and 4,179,079 disclose such apparatus for use to unwind a web from a stock roll, process the web in some manner and then rewind the web. In each case, a movable mechanical looper or accumulator provides flexibility during operation; however, neither patent discloses an apparatus in which a specific length of film can be readily selected and wound.

Commonly assigned U.S. Pat. No. 2,940,232 discloses a complex apparatus for winding strips of photographic film onto spools and then placing the wound spools within light tight magazines. FIG. 1 of the present specification shows schematically a type of mechanical accumulator known for use in an apparatus 10 of the general type disclosed in this patent, to permit changing the length of the such strips between twelve and twenty-four exposures, for example. A frame or face plate 12 supports apparatus 10 which receives a web 14 of photographic film from a supply or source not illustrated. For 35 mm film, edge perforations would be provided on the web in a previous processing step. In the following description, idler rollers are fixed to the frame of the apparatus regardless of the length of the strips to be wound, unless an idler roller is said to be removable when particular lengths are to be wound. Web 14 is wrapped partially around an idler roller 16, a drive sprocket 18 and a spring biased idler roller 20 before being transported into a first, upstream web storage module 22 which can be configured to accumulate one or more specific lengths of strip to be wound. Within module 22, the web is wrapped partially around the upper sides of an idler roller 24 and an idler roller 26 spaced horizontally from roller 24 and around the under side of a removable idler roller 28 positioned below roller 26. From roller 28, the web is wrapped partially around the upper side of an idler roller 30 and then around the undersides of an idler roller 32 and an idler roller 34 spaced horizontally from roller 32. Web 14 then is wrapped partially around the upper side of an idler roller 36 positioned above roller 34 before leaving module 22. The web then is wrapped partially around the under side of an idler roller 38 and the upper side of a drive sprocket 40 which feeds the web into a conventional punch and die mechanism 42 such as that described in U.S. Pat. No. 2,940,232. A processing station other than a punch and die might also be used. In the familiar manner, mechanism 42 partially cuts the web along its edges to shape the web for subsequent complete severing to define the ends of a strip. From mechanism 42, web 14 is transported into a second, downstream web storage module 43 which also can accumulate one or more specific lengths of strip to be wound. Within module 43 the web is wrapped partially around the under side of an idler roller 44 and over the upper side of an idler roller 46 positioned above roller 44. From roller 46, the web is transported downward past a mount 48 for a removable idler roller and after leaving module 43 is wrapped partially around the under side of an idler roller 50. From roller 50, the web passes to a conventional winder or spooler, not illustrated, where the leading end of the web is attached to a core or spool, the web is wound onto the core or spool and the web is severed at the location shaped by mechanism 42.

In FIG. 1, web 14 is illustrated as it would be threaded through modules 22 and 43 to permit winding of film strips having, for example, twenty-four exposures. To reconfigure the apparatus for winding strips having, for example, twelve exposures, the operator first would stop the apparatus. Within module 22, idler roller 28 would be removed and the web would be rethreaded directly from idler roller 26 to the underside of idler roller 36; so that, no web would be wrapped onto rollers 30, 32 and 34. A switch, not illustrated, would be thrown to signal the programable controller of the apparatus, also not illustrated, for the shorter strip. Then, within module 43, a roller would be positioned on mount 48 and the web would be rethreaded directly from the underside of roller 42 and wrapped partially around the upper side of the roller positioned on mount 48; so that, no web would be wrapped onto roller 46. Other lengths of film could be accommodated by providing other fixed and removable rollers, not illustrated.

While apparatus of the type shown in FIG. 1 has performed well for many years, only a few different strip lengths can be wound using arrays of fixed and removable rollers of the type illustrated. When photographic film is being processed, the operator must remove rollers, rethread the film and reset switches in the dark, which is time consuming and somewhat error prone. A need has existed for an apparatus in which strip lengths can be more quickly and easily changed to permit winding of strips of a far greater variety of lengths.

SUMMARY OF THE INVENTION

The primary objective of our invention is to is to provide an improved apparatus for transporting web, such as photographic film, through a system in which strips of web of many different lengths can be processed selectively with only simple, quick, fool proof adjustments to the system to change from one length of strip to another. A particular objective of our invention is to provide such an improved apparatus in which strips of photographic film of many different lengths are wound onto cores or spools. These objectives are given only by way of illustrative examples; thus other desirable objectives and advantages inherently achieved by the disclosed invention may occur or become apparent to those skilled in the art.

Our invention is defined in the appended claims. In one embodiment, an apparatus for winding selectable lengths of web is provided which comprises a source of an elongated web; a first carriage member; at least one first roller supported on the first carriage member, the web being wrapped partially around the at least one first roller; means such as a track or slide for permitting the first carriage member to be moved along a first path; means such as a spring plunger and a plurality of cooperating bores along the first path for selectably fixing the first carriage member at one of a plurality of fixed positions along the first path, each position corresponding to a length of the web to be wound; means for withdrawing the web from the source; means for detecting a position of the first carriage member along the first path and producing a first signal proportional to the position; means for partially cutting the web to shape ends of lengths to be wound; means for winding cut lengths of the web; and means such as a programable controller for controlling the means for cutting and the means for winding in response to the first signal. Our invention may further comprise a frame supporting the first carriage member, the means for permitting and the means for selectably fixing; a second roller mounted on the frame; and a third roller mounted on the first carriage member, the web being wrapped in series partially around the first roller, the second roller and the third roller before passing to the means for cutting. A span of web between the first and second rollers may be parallel to a span of web between the second and third rollers.

The first carriage member, at least one first roller, means for permitting the first carriage member and means for detecting a position of the first carriage member all may be located upstream of the means for cutting, and our invention may further comprise, downstream of the means for cutting and upstream from the means for winding, a second carriage member; at least one second roller supported on the second carriage member, the web being wrapped partially around the at least one second roller; means for permitting the second carriage member to be moved along a second path; means for selectably fixing the second carriage member at one of a plurality of fixed positions along the second path, each position corresponding to a length of the web to be wound; and means for detecting a position of the second carriage member along the second path and producing a second signal proportional to the position, the means for controlling also being responsive to the second signal. The apparatus may further comprise a frame supporting the first and second carriage members, both means for permitting and both means for selectably fixing; a third roller mounted on the frame at the means for permitting the first carriage member; a fourth roller mounted on the frame at the means for permitting the second carriage member; a fifth roller mounted on the first carriage member, the web being wrapped in series partially around the first roller, the third roller and the fifth roller before passing to the means for cutting; a sixth roller mounted on the second carriage member, the web being wrapped in series partially around the second roller, the fourth roller and the sixth roller after passing the means for cutting.

In a broader sense, our invention concerns an apparatus for selectably adjusting the length of a web accumulated at a location in a web transport system and may comprise a frame; a carriage member mounted on the frame; at least one first roller supported on the carriage member, whereby in operation the web wraps at least partially around the at least one first roller; means mounted on the frame for permitting the carriage member to be moved along a path; means for selectably fixing the carriage member at one of a plurality of fixed positions along the path, each position corresponding to a length of the web to be accumulated; and means for detecting a position of the carriage member along the path and producing a signal proportional to the position. The various means may be of the types previously described.

Our invention provides the advantage of selectively changing the lengths of strips of material to be processed within a web transport system. A unique carriage, slide and roller arrangement permits the changes to be made easily without requiring removing or relocating of rollers, or both; or requiring resetting of switches or mechanical thread-up guides. Due to use of our invention, photographic film strips of a great variety of lengths can be produced readily to satisfy the changing demands of the market place.

BRIEF DESCRIPTION OF THE DRAWINGS

The foregoing and other objectives, features and advantages of the invention will be apparent from the following more particular description of the preferred embodiments of the invention, as illustrated in the accompanying drawings.

Description of the Preferred Embodiments

Figure 1:
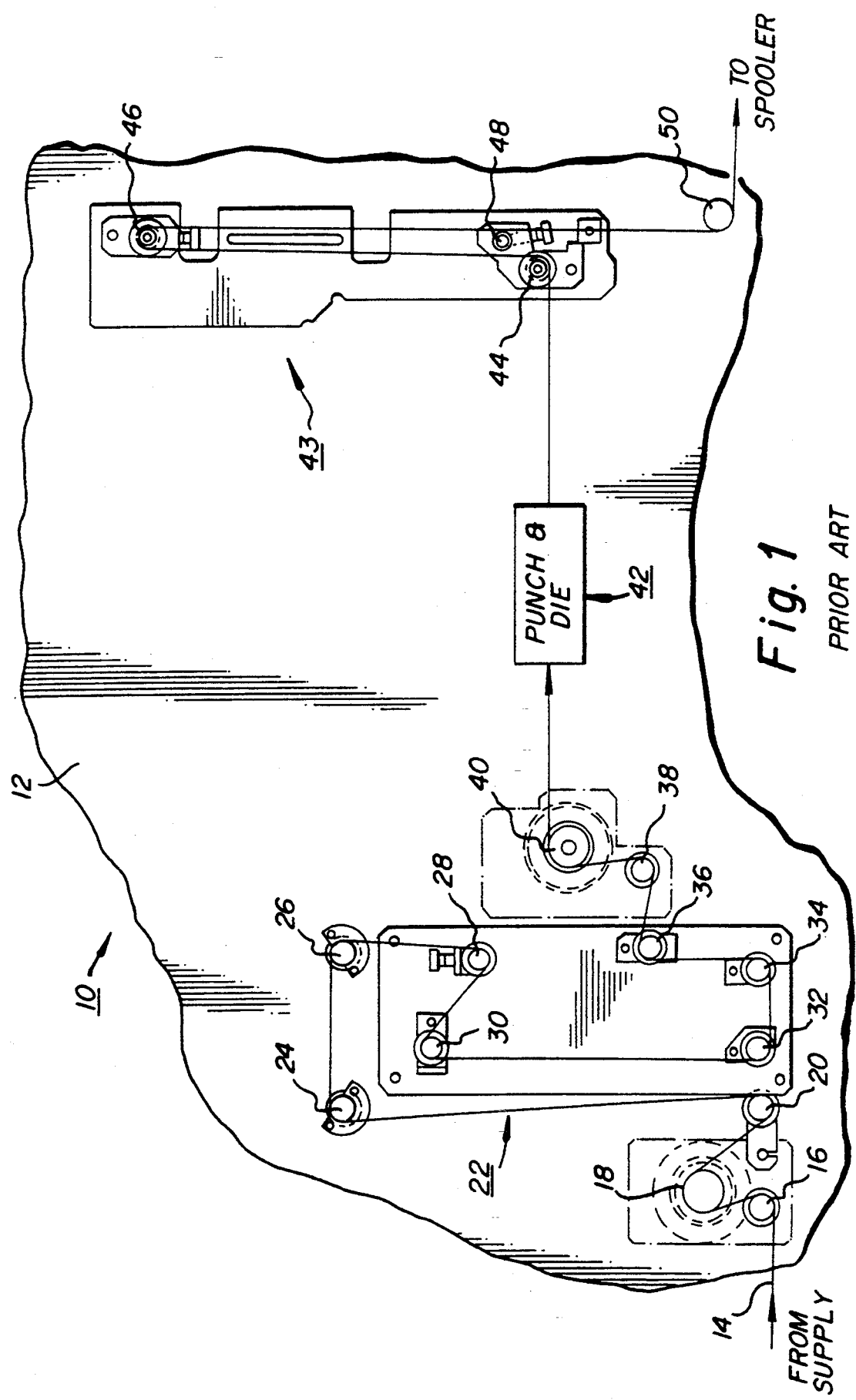
FIG. 1 shows a partially schematic elevation view of a prior art film winding apparatus.
Figure 2:
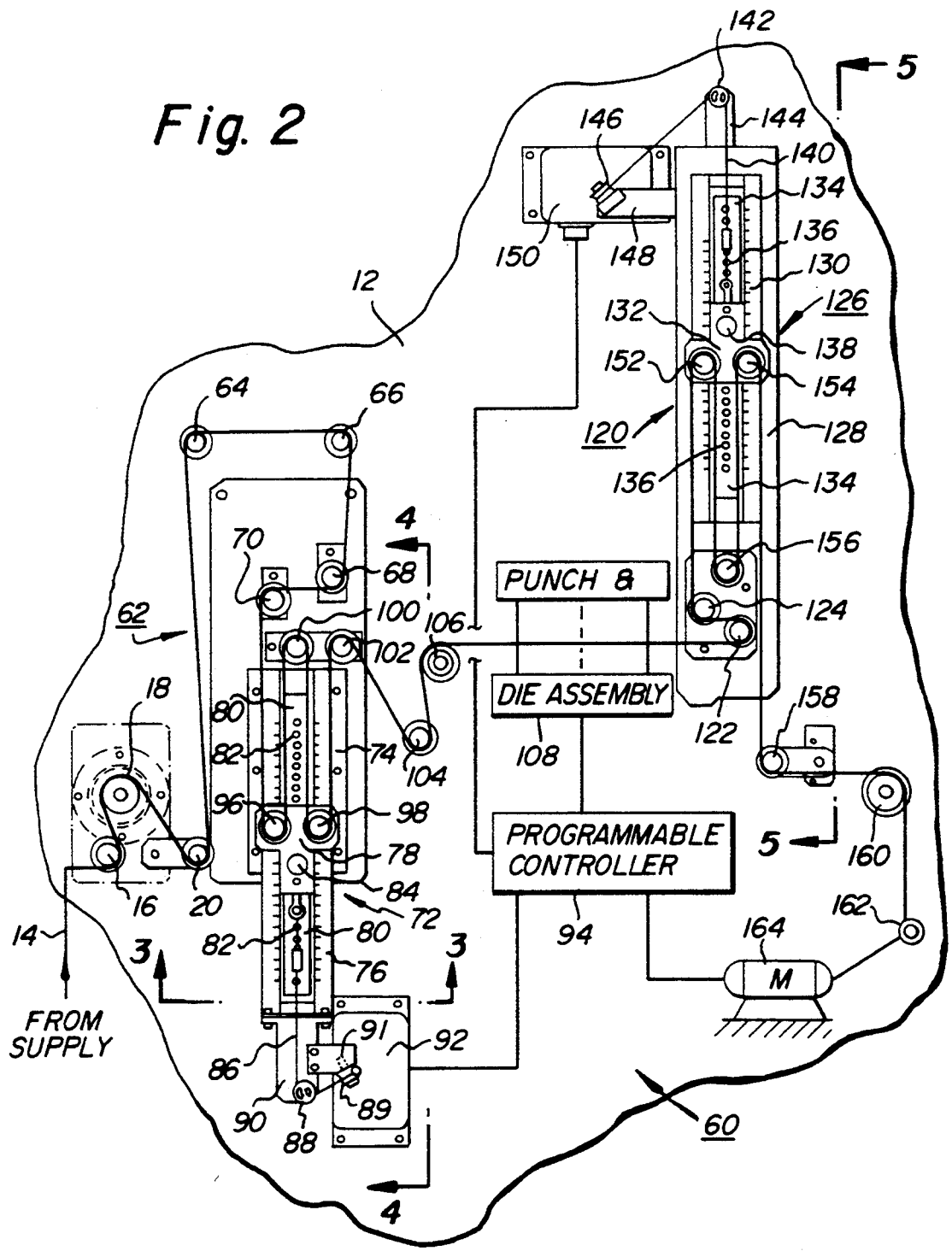
FIG. 2 shows a partially schematic elevation view of a film winding apparatus according to our invention.
Figure 3:
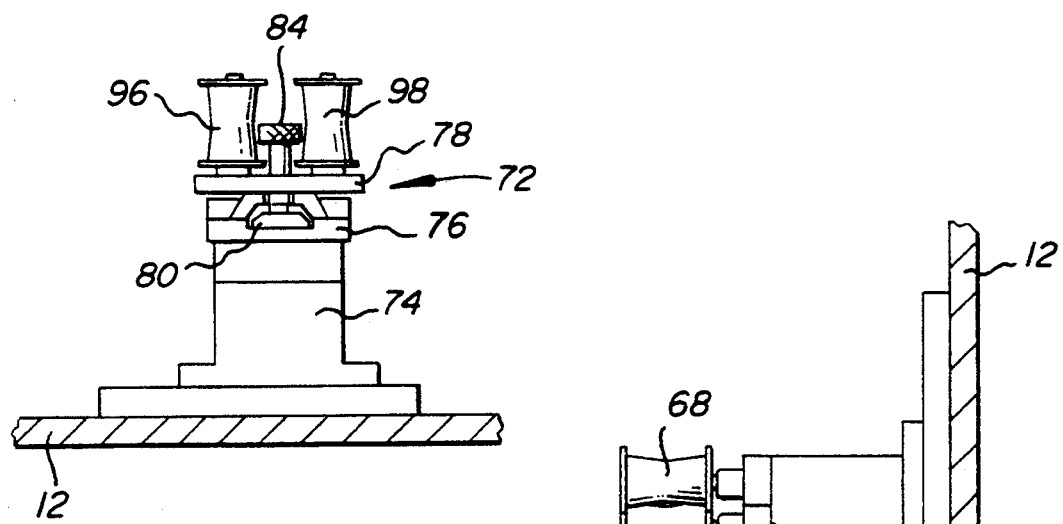
FIG. 3 shows a view along line 3—3 of FIG. 2.
Figure 4:
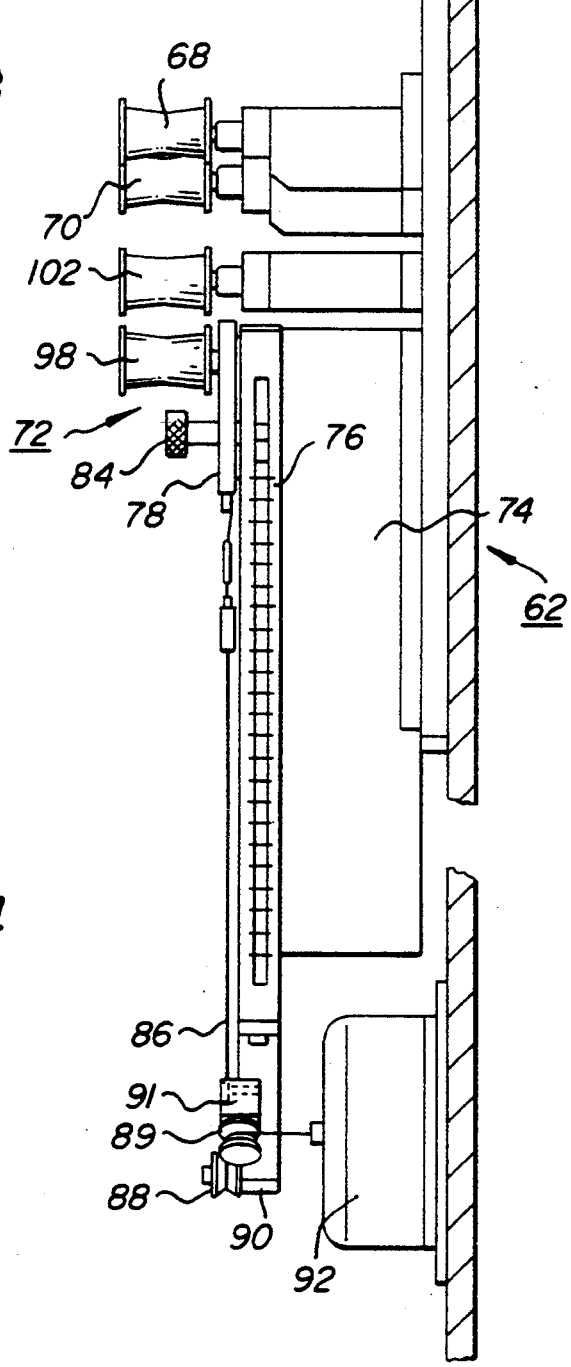
FIG. 4 shows a view along line 4—4 of FIG. 2.
Figure 5:
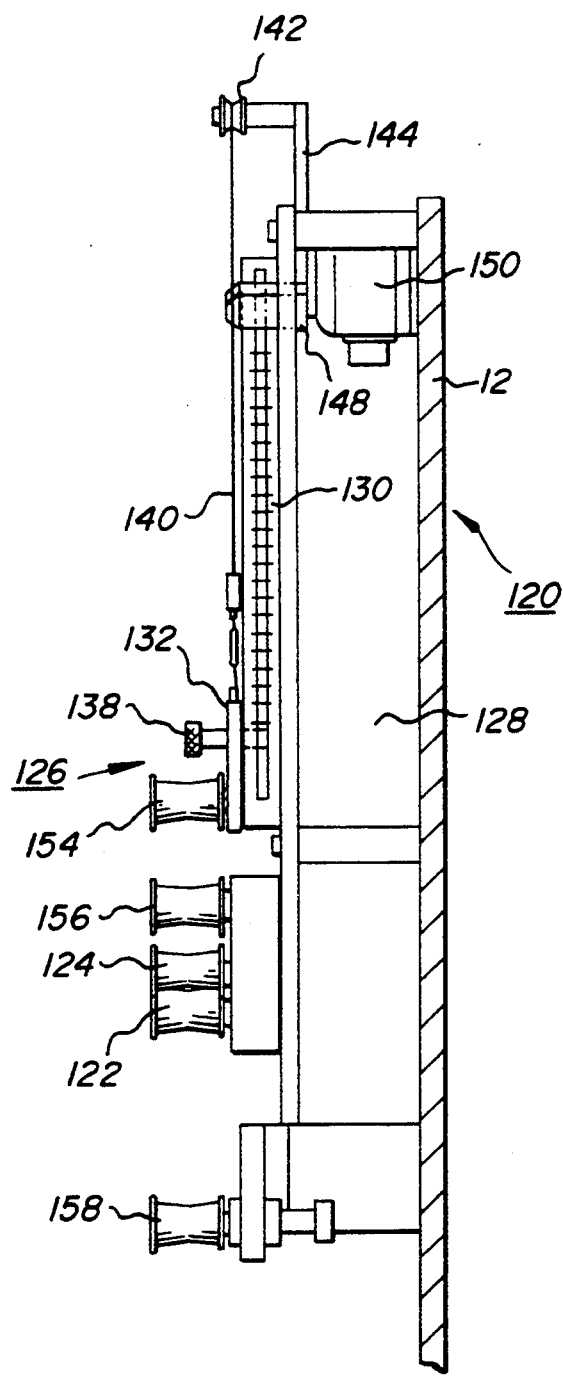
FIG. 5 shows a view along line 5—5 of FIG. 2.
Figure 6:
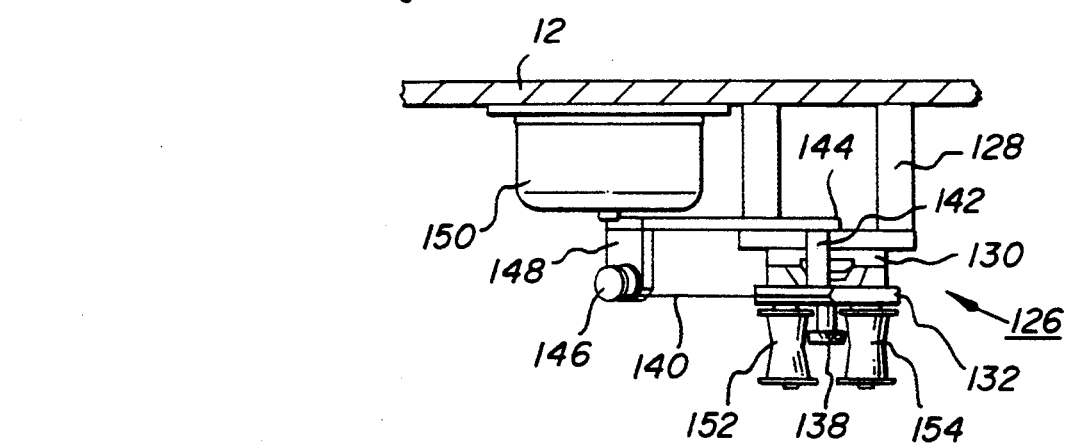
FIG. 6 shows a top view of the apparatus of FIG. 5.

The following is a detailed description of the preferred embodiments of the invention, reference being made to the drawings in which the same reference numerals identify the same elements of structure in each of the several Figures.

Referring now to FIGS. 2 to 6, a film strip winding apparatus 60 in accordance with our invention can be understood. After partially wrapping the under side of idler roller 20, web 14 is transported into a first, upstream web storage module 62 where the web is wrapped partially around the upper sides of an idler roller 64 and an idler roller 66 spaced horizontally from roller 64. The web then wraps partially around the under side of an idler roller 68 and the upper side of an adjacent idler roller 70.

Below rollers 68, 70, a first carriage and roller assembly 72 is supported by a mount 74 affixed to face plate 12. An elongated track 76 is affixed to mount 74 and slidably supports a T-shaped carriage or slider 78. Preferably, track 76 is straight; however, those skilled in the art will appreciate that a curved track could be used without departing from the scope of our invention. Behind carriage 78, track 76 is provided with an elongated bushing plate 80 which supports a plurality of drill bushings 82 each having a bore, the bushings being arranged parallel to the path defined by track 76. A bushing is provided and positioned as needed for each length of film strip to be processed by the overall apparatus. In order to selectively fix and hold stationary the position of carriage 78 along the path of track 76, a manually operable, spring biased plunger 84 is mounted on the leg of the T-shaped carriage, so that the plunger can engage the bore in a selected one of bushings 82. Thus, carriage 78 can be fixed at any selected bushing 82. A means for detecting the position of carriage 78 is provided in the form of a conventional cable extension transducer which comprises a cable 86 attached to the carriage, the cable being extended over a roller 88 mounted on a bracket 90 attached to track 76 and over a roller 89 mounted on a bracket 91 similarly attached. Cable 86 is operatively connected to a transducer 92. A suitable cable extension transducer is Model No. P510 made by UniMeasure, Inc. of Corvallis, Oreg., U.S.A. As carriage 78 is moved to different positions along track 76, cable 86 pays into or out of transducer 92, which provides a signal proportional to the position of the carriage. Those skilled in the art will appreciate that other known techniques could be used to detect the position of carriage 78 without departing from the scope of our invention. The signal from transducer 92 is sent to a conventional programable controller 94 which governs the overall operation of the apparatus in the familiar manner. The transducer mentioned, for example, generates a 0 to 10 volt signal. This signal is fed into a 12 bit analog input card in controller 94 which therefore provides a value that ranges from 0 to 4095 as the input voltage goes from 0 to 10 volts. In one actual embodiment, the range and span adjustments on transducer 92 were set such that the analog input card provided a number that ranged from 150 to 2550 as the slide went from its first to its last position. This value was divided by 100. The quotient was then a number that corresponded to the position of the slide. The remainder of the division was discarded. Adjusting the range and span of the transducer such that the remainder of the division was as close as possible to 50 made the system more robust against drift. For example, a quotient equal to one would be obtained for any value from 100 to 199.

Supported on the cross bar of the T-shaped carriage 78 are at least one roller 96 whose under side is partially wrapped by web 14 and preferably a second horizontally spaced roller 98. From roller 70 the web is transported to and wrapped around the undersides of roller 96 and then is transported to and wrapped around the upper side of an idler roller 100 mounted next to track 76 essentially on an axis defined by the row of bushings 82. From roller 100, the web is transported to and wrapped around the under side of roller 98 on carriage 78 and then to and wrapped around the upper side of an idler roller 102 mounted beside roller 100. In the illustrated embodiment, the spans of web 14 preferably are parallel which extend, respectively, between rollers 70,96; 96,100; 100, 98; and 98, 102. This arrangement makes it feasible to space bushings 82 equally along support plate 80 to provide a linear scale of strip lengths; whereas, if the spans were not parallel, the spacing would not be linear.

From roller 102, web 14 leaves web storage module 62 and wraps partially around the under side of an idler roller 104 mounted on face plate 12 and then partially around the upper side of a drive sprocket 106 similarly mounted. From sprocket 106, the web passes intermittently through a conventional punch and die assembly 108 of the type mentioned with regard to FIG. 1 and then to a second, downstream web storage module 120. Within module 120, the web wraps partially around the under and upper sides of an idler roller 122 and the under side of an idler roller 124.

Above rollers 122, 124, a second carriage and roller assembly 126 is supported by a mount 128 affixed to face plate 12. An elongated track 130 is affixed to mount 128 and slidably supports a T-shaped carriage or slider 132. As in the case of upstream module 62, track 130 preferably is straight; however, those skilled in the art will appreciate that a curved track could be used without departing from the scope of our invention. Behind carriage 132, track 130 is provided with an elongated bushing plate 134 which supports a plurality of drill bushings 136 each having a bore, the bushings being arranged parallel to the path defined by track 130. A bushing is provided and positioned as needed for each length of film strip to be processed by the overall apparatus. In order to selectively fix and hold stationary the position of carriage 132 along the path of track 130, a manually operable, spring biased plunger 138 is mounted on the leg of the T-shaped carriage, so that the plunger can engage the bore in a selected one of bushings 136. Thus, carriage 132 can be fixed at any selected bushing 136. A means for detecting the position of carriage 132 is provided in the form of a conventional cable extension transducer which comprises a cable 140 attached to the carriage, the cable being extended over a roller 142 mounted on a bracket 144 attached to track 130 and a roller 146 mounted on a bracket 148 also attached to track 130. Cable 140 then is operatively connected to a transducer 150. As carriage 132 is moved to different positions along track 130, cable 140 pays into or out of transducer 150, which provides a signal proportional to the position of the carriage. The signal from transducer 150 is sent to programable controller 94 where it is processed as previously described.

Supported on the cross bar of the T-shaped carriage 132 are at least one roller 152 and preferably a second horizontally spaced roller 154. From roller 124, the web is transported to and wrapped around the upper side of roller 152 and then to and wrapped around the under side of an idler roller 156 mounted next to track 130 essentially on an axis defined by the row of bushings 136. From roller 156, the web is transported to and wrapped around the upper side of roller 154 on carriage 132 and then to and wrapped around the under side of a spring-biased idler roller 158 mounted on face plate 12 outside module 120. In the illustrated embodiment, the spans of web 14 preferably are parallel which extend, respectively, between rollers 124, 152; 152, 156; 156, 154; and 154, 158. This arrangement makes it feasible to space bushings 136 equally along support plate 134 for reasons previously discussed.

From roller 158, web 14 is transported over the upper side of a drive sprocket 160 and then to a spool or core 162 mounted on a conventional winding quill driven by a motor 164 in the conventional manner. Between sprocket 160 and the winding quill, means, not illustrated, would be provided for attaching the lead end of the web to the core or spool and for cutting the web at the location prepared by punch and die assembly 108, as disclosed in commonly assigned U.S. Pat. No. 2,940,232. Those skilled in the art will appreciate that drive sprockets 18, 106, 160, punch and die assembly 108 and the final cutter for the web may be driven by individual motors under the control of controller 94 or in any other suitable manner.

In operation of the apparatus of FIGS. 2 to 6, web 14 is transported intermittently from the supply or source of the web to the winding quill. When the web is stopped, punch and die assembly 108 and the final cutter for the web may be operated; whereas, when the web is moving, winding quill is rotated by motor 164 to wind a strip of web onto spool or core 162. When it is desired to change the length of strips being wound, the apparatus is stopped. Plungers 84 and 138 are pulled manually out of engagement with the bushings corresponding to the last length wound; and carriages 78 and 132 are moved manually to positions corresponding with the new length to be wound, at which position plungers 84 and 138 are released to engage the bushings at the new location. As the carriages are moved, transducers 92, 150 signal controller 94 of the change in strip length to be wound. Those skilled in the art will appreciate that controller 94 easily may be set to detect a situation in which the two carriages are not positioned for the same length of strip and to signal the operator. The thread up of the web remains unchanged and the operator is not required to remove or relocate any rollers or to throw any switches or to change any thread up guides. The apparatus is then started to begin winding the new length of strips.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for winding selectable lengths of web, comprising:
- a source of an elongated web;
- a first carriage member;
- at least one first roller supported on the first carriage member, the web being wrapped partially around the at least one first roller;
- means for permitting the first carriage member to be moved along a first path;
- means for selectably fixing and holding stationary the first carriage member at each one of a plurality of fixed positions along the first path, each fixed position corresponding to a different length of the web to be wound;
- means for withdrawing the web from the source;
- means for detecting each of the plurality of fixed positions of the first carriage member along the first path and producing a first signal proportional to each detected position;
- means for partially cutting the web to shape ends of lengths to be wound;
- means for winding cut lengths of the web; and
- means for controlling the means for cutting and the means for winding in response to the first signal.

2. Apparatus according to claim 1, further comprising:
- a frame supporting the first carriage member, the means for permitting and the means for selectably fixing and holding stationary;
- a second roller mounted on the frame;
- a third roller mounted on the first carriage member, the web being wrapped in series partially around the first roller, the second roller and the third roller before passing to the means for cutting.

3. Apparatus according to claim 2, wherein a span of the web between the first and second rollers is parallel to a span of web between the second and third rollers.

4. Apparatus according to claim 1, wherein the means for permitting comprises a slide for supporting the first carriage member during movement along the first path; and the means for selectably fixing and holding stationary the first carriage member comprises a corresponding plurality of fixed bores along the slide and plunger means mounted on the first carriage member for selectably engaging a fixed bore at each position.

5. Apparatus according to claim 1, wherein the first carriage member, at least one first roller, means for permitting the first carriage member and means for detecting a position of the first carriage member all are located upstream of the means for cutting, further comprising, downstream of the means for cutting and upstream from the means for winding:
- a second carriage member;
- at least one second roller supported on the second carriage member, the web being wrapped partially around the at least one second roller;
- means for permitting the second carriage member to be moved along a second path;
- means for selectably fixing and holding stationary the second carriage member at each one of a plurality of fixed positions along the second path, each fixed position corresponding to a different length of the web to be wound; and
- means for detecting each of the plurality of fixed positions of the second carriage member along the second path and producing a second signal proportional to each detected position,
the means for controlling also being responsive to the second signal.

6. Apparatus according to claim 5, further comprising:
- a frame supporting the first and second carriage members, both means for permitting and both means for selectably fixing and holding stationary;
- a third roller mounted on the frame at the means for permitting the first carriage member;
- a fourth roller mounted on the frame at the means for permitting the second carriage member;
- a fifth roller mounted on the first carriage member, the web being wrapped in series partially around the first roller, the third roller and the fifth roller before passing to the means for cutting;
- a sixth roller mounted on the second carriage member, the web being wrapped in series partially around the second roller, the fourth roller and the sixth roller after passing the means for cutting.

7. Apparatus according to claim 6, wherein a span of the web between the first and third rollers is parallel to a span of web between the third and fifth rollers; and a span of the web between the second and fourth rollers is parallel to a span of web between the fourth and sixth rollers.

8. Apparatus according to claim 5, wherein each means for permitting comprises a slide for supporting the associated carriage member during movement along the associated path; and each means for selectably fixing and holding stationary comprises a corresponding plurality of fixed bores along the associated slide and plunger means mounted on the associated carriage member for selectably engaging a fixed bore at each position.

9. Apparatus for selectably setting a fixed length of a web accumulated at a location in a web transport system, comprising:
- a frame;
- a carriage member mounted on the frame;
- at least one first roller supported on the carriage member, whereby in operation the web wraps at least partially around the at least one first roller;
- means mounted on the frame for permitting the carriage member to be moved along a path;
- means for selectably fixing and holding stationary the carriage member at each one of a plurality of fixed positions along the path, each fixed position corresponding to a different length of the web to be accumulated; and means for detecting each of the plurality of fixed positions of the carriage member along the path and producing a signal proportional to each detected position.

10. Apparatus according to claim 9, further comprising:
a second roller mounted on the frame;
a third roller mounted on the carriage member, whereby in operation the web wraps in series partially around the first roller, the second roller and the third roller.

11. Apparatus according to claim 10, wherein a span of the web between the first and second rollers is parallel to a span of web between the second and third rollers.

12. Apparatus according to claim 9, wherein the means for permitting comprises a slide for supporting the carriage member during movement along the path; and the means for selectably fixing and holding stationary the carriage member comprises a corresponding plurality of fixed bores along the slide and plunger means mounted on the carriage member for selectably engaging a fixed bore at each position.

* * * * *